United States Patent

Satran et al.

[11] Patent Number: 5,853,267
[45] Date of Patent: Dec. 29, 1998

[54] CUTTING INSERT

[75] Inventors: Amir Satran, Kfar Vradim; Yuri Men, Haifa, both of Israel

[73] Assignee: Iscar Ltd., Migdal Tefen, Israel

[21] Appl. No.: 900,331

[22] Filed: Jul. 25, 1997

[30] Foreign Application Priority Data

Aug. 22, 1996 [IL] Israel .......................................... 119114
May 9, 1997 [IL] Israel .......................................... 120814

[51] Int. Cl.$^6$ ....................................................... B23C 5/20
[52] U.S. Cl. ............................ 407/113; 407/114; 407/116
[58] Field of Search .................................. 407/113, 114, 407/115, 116, 97, 102, 103

[56] References Cited

U.S. PATENT DOCUMENTS

| | | | |
|---|---|---|---|
| 4,512,689 | 4/1985 | Bylund | 407/103 X |
| 5,083,887 | 1/1992 | Dotany . | |
| 5,425,603 | 6/1995 | Dutschke et al. . | |
| 5,441,370 | 8/1995 | Pantzar et al. | 407/113 |
| 5,447,396 | 9/1995 | Pantzar et al. . | |
| 5,513,931 | 5/1996 | Reiterman et al. | 407/113 |
| 5,542,793 | 8/1996 | Deiss et al. . | |
| 5,556,239 | 9/1996 | Reiterman | 407/113 |
| 5,622,460 | 4/1997 | Satran et al. . | |

FOREIGN PATENT DOCUMENTS

| | | |
|---|---|---|
| 0 373 292 | 7/1989 | European Pat. Off. . |
| 43 25 999 | 2/1995 | Germany . |
| 44 11 475 1 | 10/1995 | Germany . |
| WO 95/17284 | 6/1995 | WIPO . |

*Primary Examiner*—Andrea L. Pitts
*Assistant Examiner*—Henry W. H. Tsai
*Attorney, Agent, or Firm*—Pennie & Edmonds LLP

[57] ABSTRACT

A chip cutting insert has an upper chip surface, a lower base surface, at least three side surfaces and at least two cutting edges formed at the intersection of the upper surface with two insert side surfaces. Each cutting edge has leading and trailing ends. The side surface associated with each cutting edge comprises an upper primary relief section inclined to the insert base surface at a first interior angle, and a lower secondary relief section inclined to the insert base surface at a second interior angle, the second interior angle being acute and being different from the first interior angle at least along a part of the cutting edge.

10 Claims, 5 Drawing Sheets

5,853,267

CUTTING INSERT

FIELD OF THE INVENTION

The present invention refers to a cutting insert for chip cutting operations, in particular, for use in milling cutter tools.

BACKGROUND OF THE INVENTION

A cutting insert of the kind to which the present invention particularly refers is disclosed in U.S. Pat. No. 5,447,396. The insert is produced by form pressing and subsequent sintering and is formed with a central through bore adapted to receive a clamping screw for mounting the insert in an insert receiving pocket of a cutting tool. The insert has an upper chip surface, a lower base surface and two pairs of opposite major and minor side surfaces extending therebetween and defining with the insert upper surface respective major and minor cutting edges. Each major side surface comprises upper and lower relief sections intersecting with each other at an intersection line, the upper relief section being twistedly curved and extending outwardly from the insert upper surface, and the lower relief section extending inwardly (positively) towards the insert lower surface in a conventional manner so as to function as the insert positioning surface, when the insert is mounted in the insert receiving pocket of the tool.

WO 95/17284 teaches a cutting insert similar to that described above in the specific geometry of the upper relief section of the major side surface. However, in the insert of WO 95/17284, the geometries of the upper and lower relief sections of the major side surfaces are not controlled separately but rather the upper and lower relief sections are in the form of a single side surface extending outwardly from the insert upper surface towards the insert lower surface. The insert minor side surfaces are oriented in the manner similar to that of the insert major side surfaces so that, when the cutting insert is mounted in an insert receiving pocket of a tool holder to present an operative cutting edge associated with an operative major side surface, the outwardly extending inoperative major and minor side surfaces function as insert positioning surfaces, whereby effective dovetail-like clamping of the insert in the pocket is provided. Thereby, loads applied to a clamping screw by means of which the insert is mounted in the tool, are essentially reduced.

However, in a cutting insert as described in WO 95/17284, the extent of the inclination of the insert side surface with respect to the insert base is limited by the clearance which must be provided between the insert major side surface adjacent the insert base surface and a workpiece surface being machined, which limitation is especially critical with cutting tools having relatively small cutting diameters. Thus, in such tools, available angles of inclination of the major side surface with respect to the insert base are so close to 90° that they do not suit for clamping the insert in a dovetail manner.

It is the object of the present invention to provide a new cutting insert which has advantages in the above respect.

SUMMARY OF THE INVENTION

In accordance with the present invention, there is provided a chip cutting insert having an upper chip surface, a lower base surface, at least three side surfaces and at least two cutting edges formed at the intersection of said upper surface with two insert side surfaces, each cutting edge having leading and trailing ends, the side surface associated with each cutting edge comprising an upper primary relief section inclined to the insert base surface at a first interior angle, and a lower secondary relief section inclined to the insert base surface at a second interior angle, said second interior angle being acute and being different from the first interior angle at least along a part of the cutting edge.

Preferably, said first interior angle is also acute, but, if required, it may equal or be about 90°. With the first interior angle being acute, it is preferable that it is is more acute than the second interior angle. Thereby, the insert side surface has such a shape that, at least along a part of the length of the cutting edge, its acute interior angle with the insert base surface varies along the insert height from its minimal value adjacent the insert upper surface to its maximal value adjacent the insert base surface. This allows to retain required clearances between the insert, along its entire height, and a workpiece surface being machined, and this with the insert having a maximal possible width in its cross-section taken perpendicular to the cutting edge.

In a preferred embodiment, the insert has a pair of opposite major side surfaces, a pair of opposite minor side surfaces and a pair of opposite indexable major cutting edges associated with said opposite major side surfaces. Preferably, said primary relief section of each major side surface is curved, said first interior angle varying along the associated major cutting edge so that, when the insert is mounted in a tool of an appropriate cutting diameter with its operative cutting edge being inclined to the tool axis, its side relief angle is substantially invariant along the cutting edge. Preferably, said secondary relief section is substantially planar and constitutes the insert major positioning surface.

Preferably, each minor side surface of the insert is formed with a minor positioning surface which extends outwardly in the direction of the insert base surface. It is also preferable that each minor side surface forms with the insert upper surface a minor cutting edge which, in the insert plan view, at least slightly protrudes beyond said minor positioning surface of the insert.

BRIEF DESCRIPTION OF THE DRAWINGS

For a better understanding of the present invention and to show how the same may be carried out in practice, reference will now be made to the accompanying drawings, in which.

DESCRIPTION OF THE PREFERRED EMBODIMENT

Figure 1:
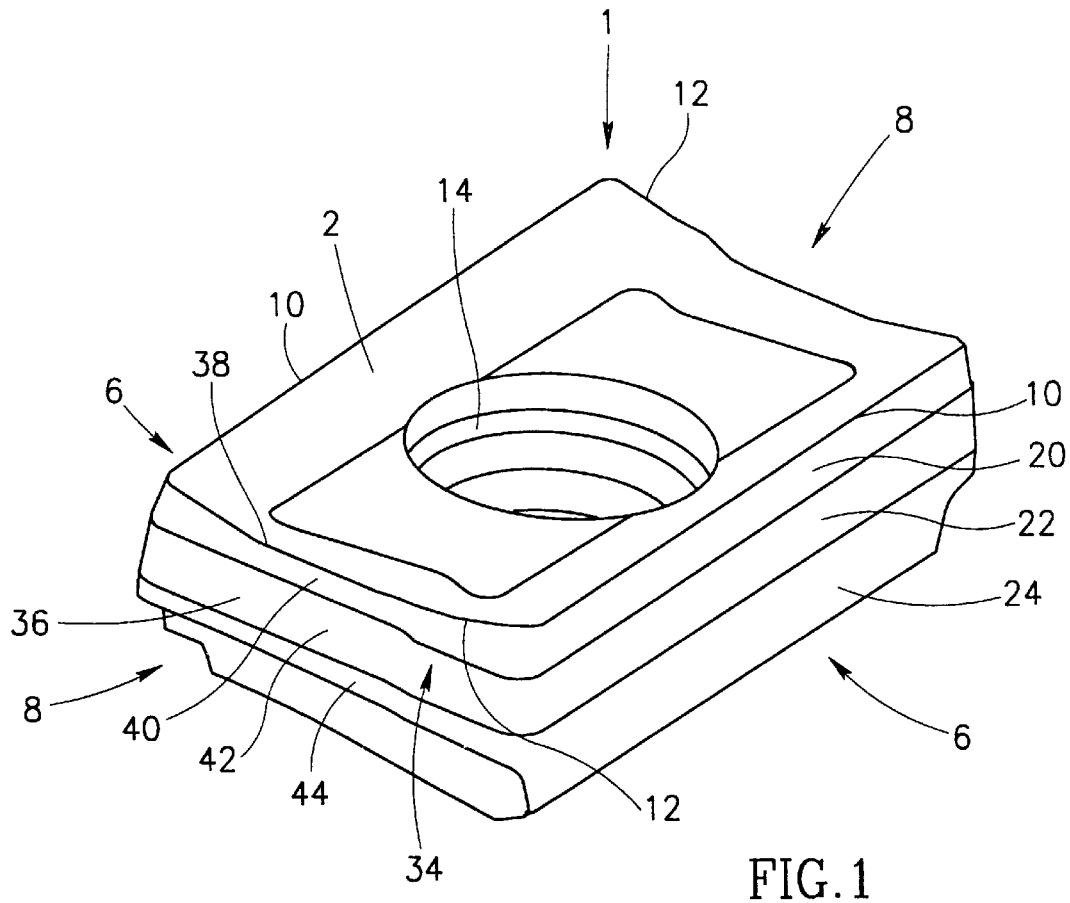
FIG. 1 is an isometric view of a cutting insert according to the present invention.

A chip cutting insert 1 according to the present invention is illustrated in FIGS. 1, 2, 3 and 4. As seen, the cutting insert 1 is a prismatic indexable insert having an upper chip surface 2, a lower base surface 4, two opposite major side surfaces 6 and two opposite minor side surfaces 8. The cutting insert 1 has two major cutting edges 10 and two minor cutting edges 12 formed at the intersection of the respective major 6 and minor 8 side surfaces with the upper chip surface 2 of the insert. The insert 1 is formed with a central through bore 14 adapted to receive a clamping screw for mounting the insert 1 in an insert receiving pocket formed in a tool holder of a cutting tool (not shown).

Figure 4:
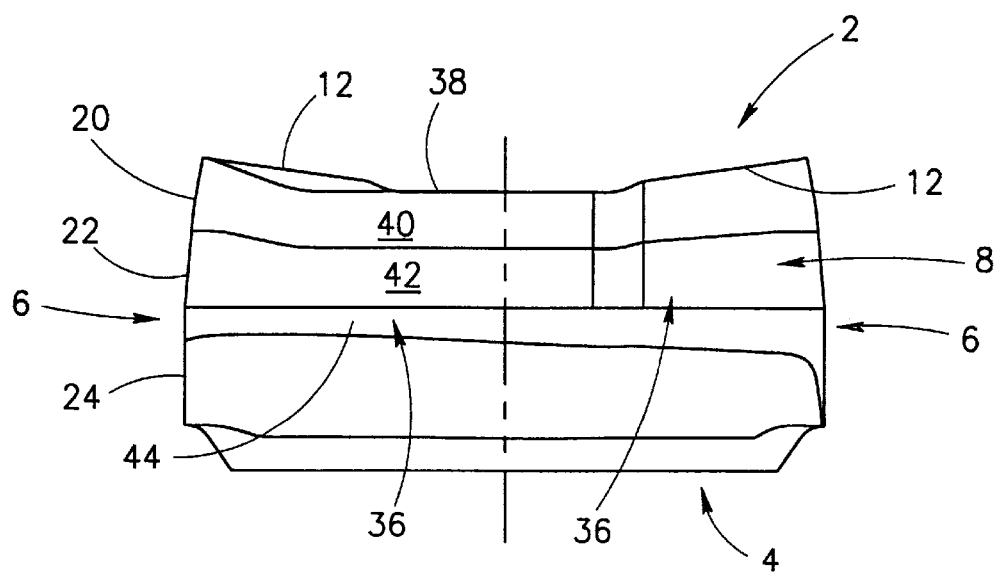
FIG. 4 is a front view of the cutting insert shown in FIG. 1.
Figure 5:
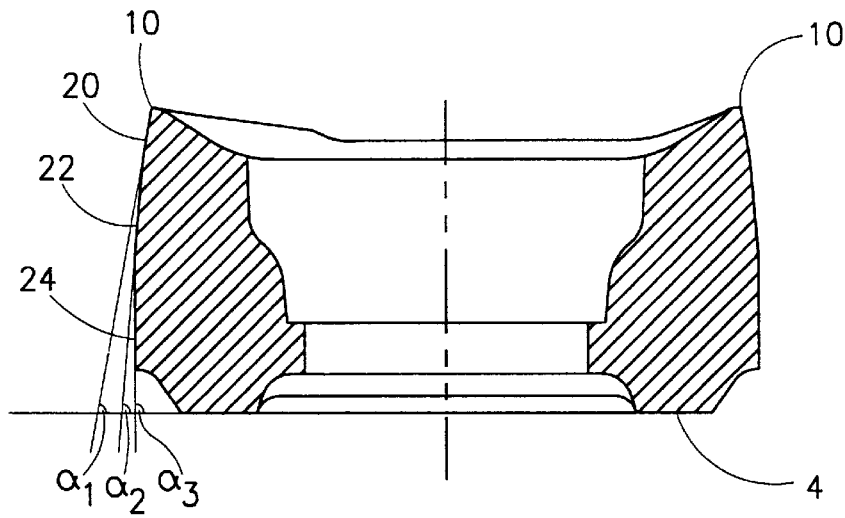
FIG. 5 is a cross-sectional view of the insert taken along the line V—V in FIG. 3.

As seen in FIGS. 4 and 5, each major side surface 6 has a primary relief section 20, a secondary relief section 22 and a third section 24 disposed adjacent to the insert base surface 4, which sections are inclined to the insert base surface at different first, second and third interior angles designated respectively at $\alpha_1$, $\alpha_2$ and $\alpha_3$ in FIG. 5.

Figure 7:
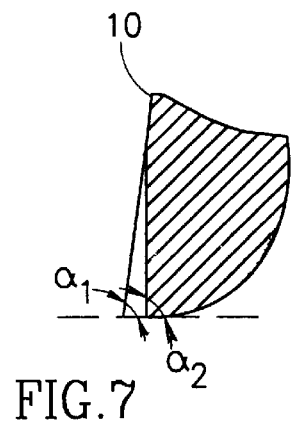
Figure 8:
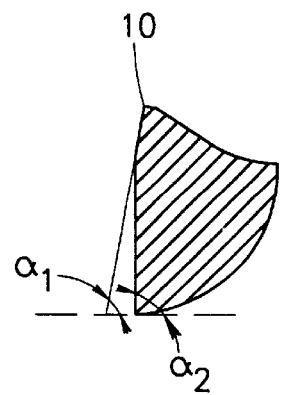
Figure 9:
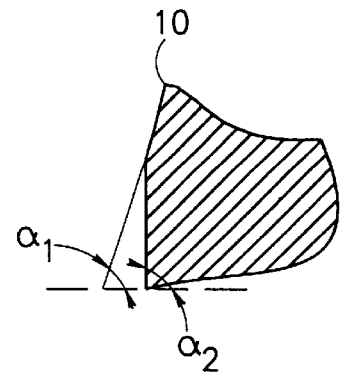

As seen in FIGS. 7, 8 and 9, in the described embodiment, the first and the second interior angles $\alpha_1$ and $\alpha_2$ are both acute substantially along the entire length of the associated major cutting edge 10, the former angle being more acute than the latter angle. The first interior angle $\alpha_1$ varies along the length of the cutting edge 10 so that, when the insert is mounted in the tool with its operative major cutting edge being inclined to the tool axis, its relief angle is substantially invariant along the length of the cutting edge. In the described embodiment, the angle $\alpha_1$ varies from being about 90° adjacent the insert leading end 30 associated with the minor cutting edge 12, to its minimal value adjacent the insert trailing end 32. The secondary relief section 22 of the insert major side surface 6 is planar and is adapted to function as the insert major positioning surface. Thus, the second interior angle $\alpha_2$ is invariant along the length of the cutting edge 12 and may be substantially in the range from 65° to 87°, depending in particular on the insert dimensions and a cutting diameter of the cutting tool. The third interior angle $\alpha_3$ is about 90°.

Figure 3:
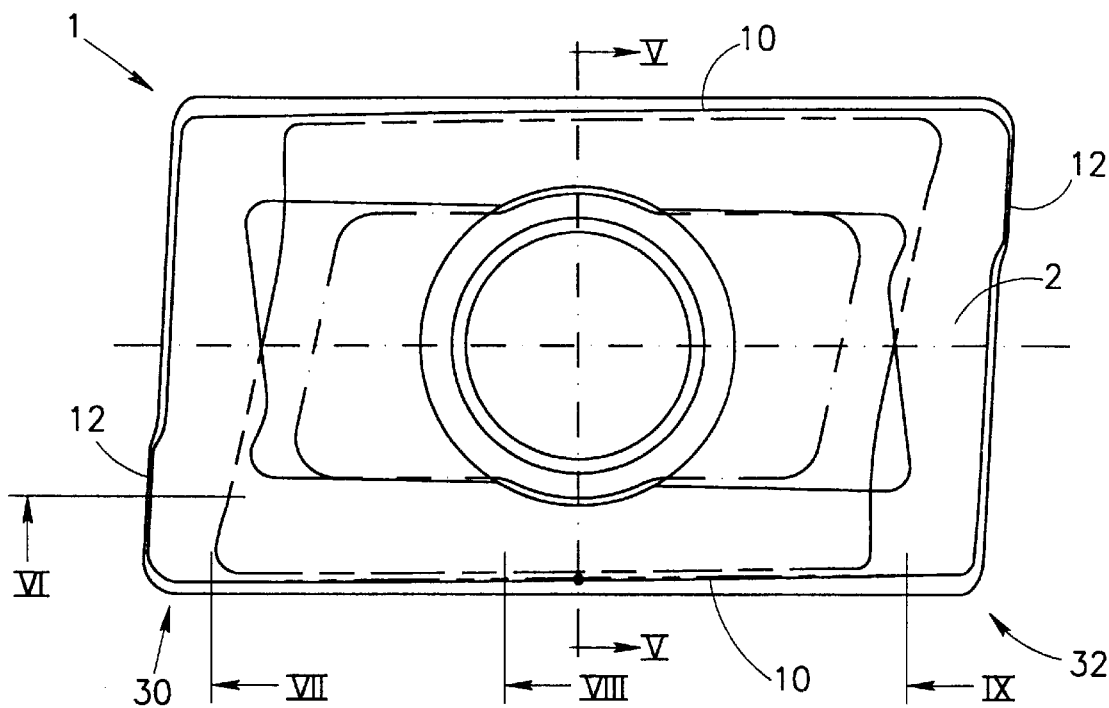
FIG. 3 is a plan view of the cutting insert shown in FIG. 1.

As seen in FIG. 1, each minor side surface 8 has a region 34 associated with the minor cutting edge 12 and a region 36 is associated with an edge 38 which does not bear any cutting function. As seen in FIG. 3, the minor cutting edge 12 and the region 34 of the minor side surface 8 protrude with respect to the region 36 thereof.

Figure 2:
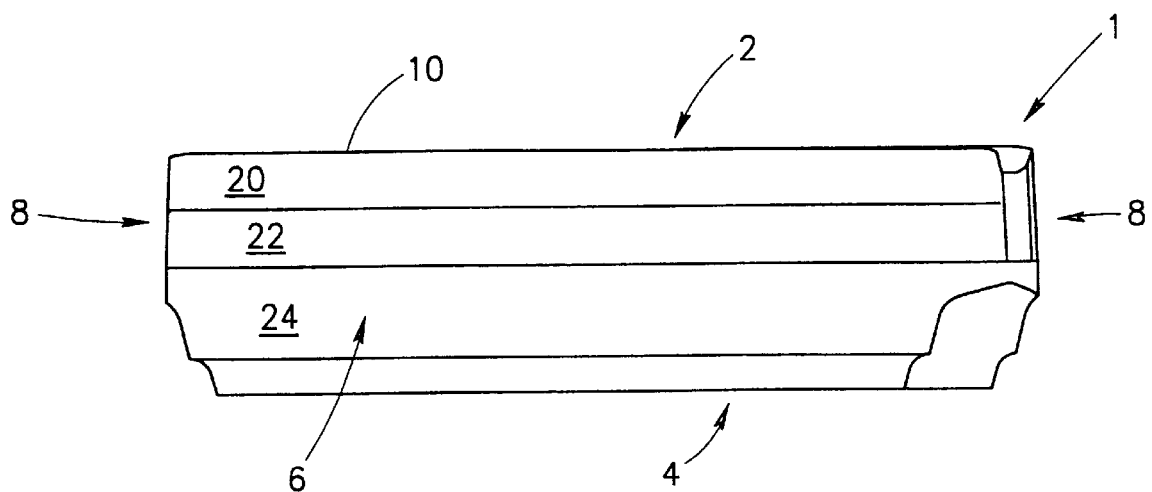
FIG. 2 is a side view of the cutting insert shown in FIG. 1.
Figure 6:
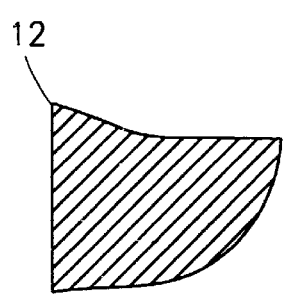
FIGS. 6, 7, 8 and 9 are cross-sectional views of the cutting insert taken along the respective lines VI—VI, VII—VII, VIII—VIII and IX—IX in FIG. 3.

As seen in FIGS. 1 and 2, the minor side surface 8 has a geometry similar to that of the major side surface 6 in that it extends outwardly from the insert upper surface 2 to the insert base surface 4. As shown in FIGS. 1 and 4, similarly to the major side surface 6, the minor side surface 8 has first, second and third sections 40, 42 and 44. The first, primary relief section 40 of the region 34 adjacent the minor cutting edge 12, preferably, has a negative relief geometry, as shown in FIG. 6. The second section 42 of the region 36 of the minor side surface, associated with the non-cutting edge 38, is adapted to function as the insert minor positioning surface.

The insert 1 as described above is adapted for mounting in the insert receiving pocket of the cutting tool in a dove-tail manner substantially as described in detail in U.S. Ser. No. 08/360,522 or its counterpart WO 95/17284, which are incorporated herein by reference. When the cutting insert 1 is mounted in the cutting tool in such a manner, its inoperative major side surface and its inoperative minor side surface which is remote from the insert operative cutting corner converge away therefrom, with the inclined major and minor positioning surfaces abutting corresponding side walls of the insert receiving pocket.

Figure 10:
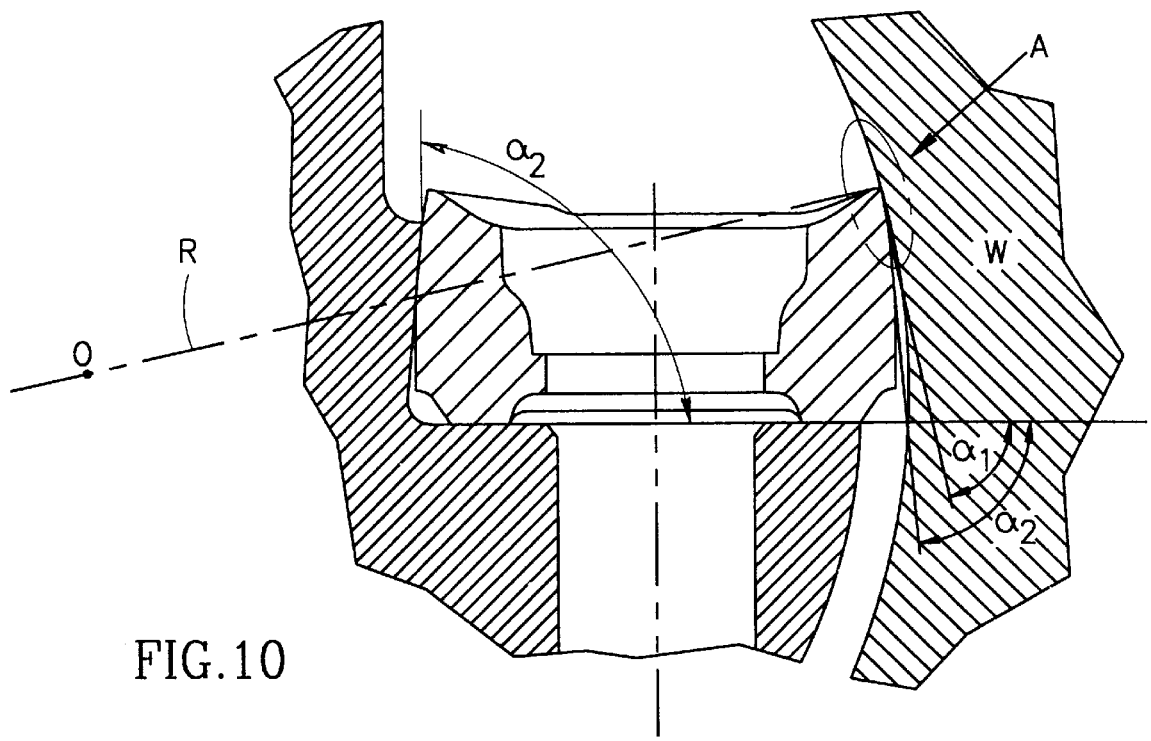
FIG. 10 is a cross-sectional view of the cutting insert shown in FIG. 1, when mounted in a tool holder.
Figure 11:
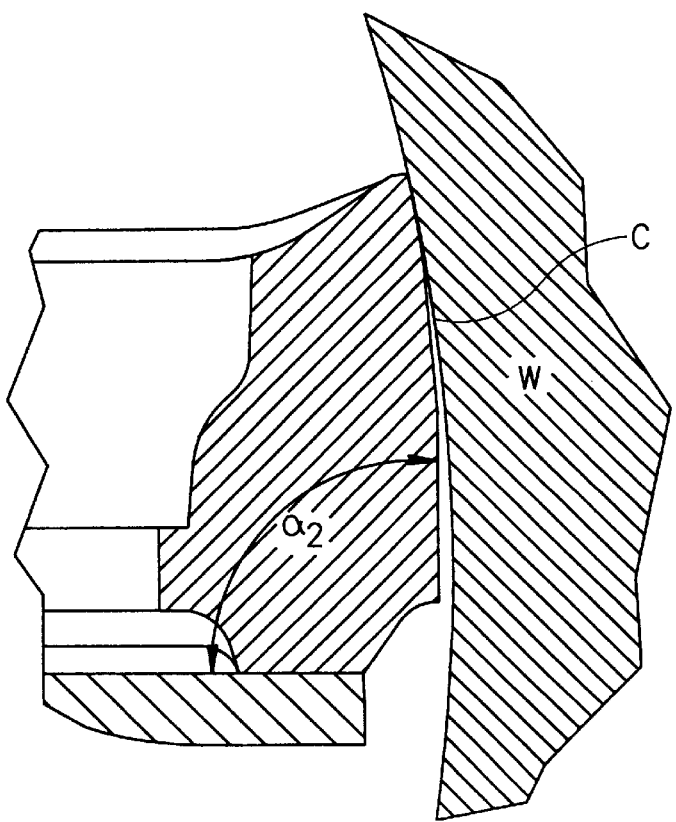
FIG. 11 shows an enlarged detail A in FIG. 10.

It is seen in FIGS. 10 and 11 that, in addition to the advantages connected with the dove-tail mounting of the insert in the tool, the specific geometry of the insert major side surfaces according to the present invention, allows the insert to retain, during a cutting operation, a required clearance C from a workpiece W being machined, along the entire insert height.

It should be specifically noted that a cutting insert with the geometry of the side surfaces according to the present invention can be easily manufactured by existing net-shape powder metallurgy processing, preferably by means of form pressing in a die, without the necessity of subsequent grinding.

Figure 12A:
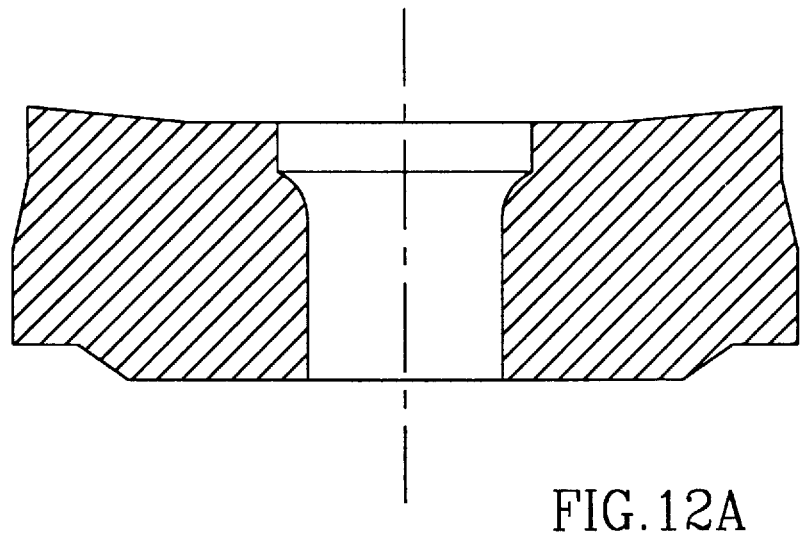
FIG. 12a and 12b are cross-sectional views of a cutting insert according alternative embodiments of the present invention.
Figure 12B:
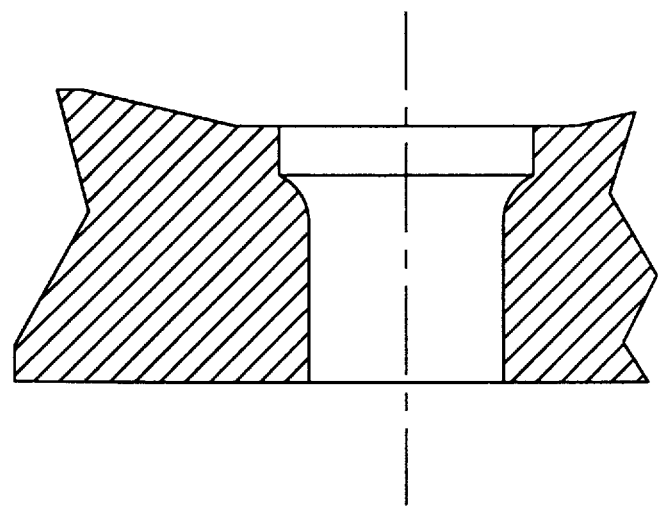

The cutting insert of the present invention may have features different from those described above. For example, the cutting insert may be of triangular, square or any other suitable configuration and accordingly have three or more identical major cutting edges. Depending on the position of the insert in the tool, the angle $\alpha_1$ defined by the primary relief section of the major side surfaces may be more acute adjacent the leading end of the operative cutting edge than adjacent the trailing end thereof. The angle $\alpha_1$ does not necessarily need to be acute but may rather be negative or positive as illustrated in respective FIGS. 12a and 12b. In general, the angle $\alpha_1$ may be in the range 90°±15°. It is also not necessary that the insert major side surfaces have the above described specific geometry along the entire length of their associated major cutting edge but they may rather have it only along a part thereof. In addition, the insert cutting edges may have any appropriate geometry and orientation. Thus, for example, the insert major cutting edges may be inclined to the insert base.

It will be appreciated that the cutting insert according to the present invention may have variations others than those described above.

LIST OF REFERENCE NUMERALS 1 cutting insert
2 upper chip surface
4 lower base surface
6 major side surfaces
8 minor side surfaces
10 major cutting edges
12 minor cutting edges
14 central through bore
20 primary relief section of the major side surface
22 secondary relief section of the major side surface
24 third section of the major side surface
30 leading end of the major cutting edge
32 trailing end of the major cutting edge
34 region of the minor side surface associated with the minor cutting edge
36 region of the minor side surface not associated with the minor cutting edge
38 non-cutting edge associated with the region 36
40 first section of the minor side surface
42 second section of the minor side surface
44 third section of the minor side surface

We claim:

1. A chip cutting insert having an upper chip surface, a lower base surface, at least three side surfaces and at least two cutting edges formed at an intersection of said upper surface with two insert side surfaces, each cutting edge having leading and trailing ends, the side surface associated with each cutting edge comprising an upper primary relief section inclined to the insert base surface at a first interior angle, and a lower secondary relief section inclined to the insert base surface at a second interior angle, said second interior angle being acute and being different from the first interior angle at least along a part of the cutting edge.

2. A chip cutting insert according to claim 1, wherein said first interior angle is acute at least along a part of a cutting edge length.

3. A chip cutting insert according to claim 2, wherein the first interior angle is more acute than the second interior angle at least along a part of the cutting edge length.

4. A chip cutting insert according to claim 1, wherein said first interior angle equals 90° at least along a part of the cutting edge length.

5. A chip cutting insert according to claim 1, wherein said first interior angle is obtuse at least along a part of the cutting edge length.

6. A chip cutting insert according to claim 1, wherein the insert has a pair of opposite major side surfaces, a pair of opposite minor side surfaces and a pair of opposite indexable major cutting edges associated with said opposite major side surfaces.

7. A chip cutting insert according to claim 1, wherein said primary relief section is curved, said first interior angle varying along a length of an associated cutting edge so that a relief angle of the insert, when mounted in a cutting tool, is invariant along an operative cutting edge of the insert.

8. A chip cutting insert according to claim 1, wherein said secondary relief section is substantially planar and constitutes a major positioning surface of the insert.

9. A chip cutting insert according to claim 6, wherein each minor side surface of the insert is formed with a minor positioning surface extending outwardly in the direction towards the insert base surface.

10. A chip cutting insert according to claim 9, wherein each minor side surface forms with the insert upper surface a minor cutting edge which, in a plan view of the insert, at least slightly protrudes beyond said minor positioning surface of the insert.

* * * * *